United States Patent [19]

Nishimura

[11] Patent Number: 5,506,700

[45] Date of Patent: Apr. 9, 1996

[54] FACSIMILE APPARATUS HAVING A/D CONVERTER SHARED WITH A PLURALITY OF ANALOG SENSORS

[75] Inventor: Shinichi Nishimura, Isehara, Japan

[73] Assignee: Ricoh Company, Ltd., Tokyo, Japan

[21] Appl. No.: 261,974

[22] Filed: Jun. 17, 1994

[30] Foreign Application Priority Data

Jun. 18, 1993 [JP] Japan .................................. 5-170880

[51] Int. Cl.⁶ .............................. H04N 1/00; H03M 1/00
[52] U.S. Cl. ........................... 358/468; 358/425; 341/141
[58] Field of Search .................................... 358/468, 513, 358/514, 474, 482, 483, 434, 425, 409; 341/141; 355/204, 209; 364/928

[56] References Cited

U.S. PATENT DOCUMENTS 4,875,099  10/1989  Sakai et al. ............................ 358/483

FOREIGN PATENT DOCUMENTS 4-47751  2/1992  Japan .

Primary Examiner—Edward L. Coles, Sr.
Assistant Examiner—Kimberly A. Williams
Attorney, Agent, or Firm—Popham, Haik, Schnobrich & Kaufman, Ltd.

[57] ABSTRACT

A facsimile apparatus in which a single A/D converter used for analog image signals is shared efficiently with other analog sensors. The facsimile apparatus has an image scanner for outputting an analog image signal by scanning an original and at least one analog sensor for outputting an analog detection signal. A multiplexer is provided for selecting one of the analog signals including the analog image signal and the analog detection signal. An analog/digital converter converts the analog signal selected by the multiplexer into a digital signal. A primary scanning counter counts the number of pulses of a pixel clock signal indicating a reading timing of each pixel so as to output a count value, the count value being reset each time a line synchronization signal indicating a first position of each scanning line is supplied thereto. A decoder is provided for generating a selection signal in accordance with the count value supplied by the primary scanning counter, and supplies the selection signal to the multiplexer so that the multiplexer selects one of the analog signals corresponding to the selection signal.

16 Claims, 2 Drawing Sheets

FACSIMILE APPARATUS HAVING A/D CONVERTER SHARED WITH A PLURALITY OF ANALOG SENSORS

BACKGROUND OF THE INVENTION

The present invention relates to a facsimile apparatus in which an analog/digital converter, used for converting analog image signals to digital image signals, can be shared with other analog sensors so as to convert analog signals from other sensors into digital signals.

In a conventional facsimile apparatus, a high speed and high resolution (having a large number of bits) analog/digital (A/D) converter is provided for converting analog image signals, obtained by a scanner scanning an original, into digital image signals.

The conventional facsimile apparatus also has various sensors, such as a temperature sensor, for outputting analog signals. In order to read detection signals from the analog sensors by a microcomputer system provided in the facsimile machine, it is required that these analog signals be converted into digital signals. Accordingly, in the conventional facsimile apparatus, an A/D converter is provided for each analog sensor. Such a construction results in a large number of A/D converter being provided in one facsimile apparatus, and thus manufacturing costs of the facsimile apparatus are increased.

In order to eliminate the above-mentioned problem, Japanese Laid-Open Patent Application No. 4-47751 (titled "facsimile apparatus") has proposed an improved facsimile apparatus. In this improved facsimile apparatus, a plurality of analog signals, including analog image signals and various analog sensor signals, are converted into corresponding digital signals by a single A/D converter with a multiplexer used for sequentially switching analog signal inputs from the sensors.

However, in the above-mentioned facsimile apparatus, there are the following problems:

a) to perform a scanning operation, a signal for operating the multiplexer must be generated;

b) the accuracy of the digital signals output from the A/D converter may be deteriorated if an amplitude of voltage of the analog sensors differs from sensor to sensor;

c) because an A/D converter for converting analog image signals into digital signals is used, the digital signals output from the A/D converter have an unnecessarily large number of bits, and thus the analog sensors occupy a large memory area;

d) although signals from different analog sensors are sampled during the same period, it is not always required that the sampling frequency for each analog sensor be the same; and e) because the digital signals converted by the A/D converter are stored in a memory of an upper controlling circuit, an address control of the analog to digital conversion system may become complex.

SUMMARY OF THE INVENTION

It is a general object of the present invention to provide an improved and useful facsimile apparatus in which the above-mentioned disadvantages are eliminated.

A more specific object of the present invention is to provide a facsimile apparatus in which a single A/D converter used for converting analog image signals is shared efficiently with other analog sensors.

Another object of the present invention is to provide a facsimile apparatus in which a single A/D converter used for converting analog image signals is shared efficiently with other analog sensors including analog sensors for outputting analog signals in asynchronization with a scanning operation of a scanner of the facsimile apparatus.

In order to achieve the above-mentioned object, there is provided according to the present invention, a facsimile apparatus having an image scanner for outputting an analog image signal by scanning an original and at least one analog sensor for outputting an analog detection signal, the facsimile apparatus comprising:

a multiplexer provided for selecting one of analog signals including the analog image signal and the analog detection signal;

an analog/digital converter converting the one of the analog signals selected by the multiplexer into a digital signal;

a primary scanning counter counting the number of pulses of a pixel clock signal indicating a reading timing of each pixel so as to output a first count value, the first count value being reset each time a line synchronization signal indicating a first position of each scanning line is supplied thereto; and a decoder provided for generating a first selection signal in accordance with the first count value supplied by the primary scanning counter, and supplies the first selection signal to the multiplexer so that the multiplexer selects one of the analog signals corresponding to the first selection signal.

Additionally, there is provided according to the present invention, a facsimile apparatus having a plurality of analog sensors including an image scanner, at least one first sensor and at least one second sensor, the image scanner outputting an analog image signal by scanning an original, the first sensor outputting a first analog signal in synchronization with a scanning operation performed by the image scanner, and the second sensor outputting a second analog signal in asynchronization with the scanning operation performed by the image scanner, the facsimile apparatus comprising:

a multiplexer provided for selecting one of the analog signals including the analog image signal, the first analog signal and the second analog signal;

an analog/digital converter converting the one of analog signals selected by the multiplexer into a digital signal;

a primary scanning counter counting the number of pulses of a pixel clock signal indicating a reading timing of each pixel so as to output a first count value, the first count value being reset each time a line synchronization signal indicating a first position of each scanning line is supplied thereto; and a decoder provided for generating a first selection signal in accordance with the first count value supplied by the primary scanning counter, and supplying the first selection signal to the multiplexer so that the multiplexer selects one of the first analog signals corresponding to the first selection signal, the first selection signal being generated, when a signal representing a detection timing of the second analog signal output from the second sensor is supplied to the decoder means, so that the second analog signal output from the second sensor is selected by the multiplexer.

Other objects, features and advantages of the present invention will become more apparent from the following

DETAILED DESCRIPTION OF THE PREFERRED EMBODIMENT

Figure 1:
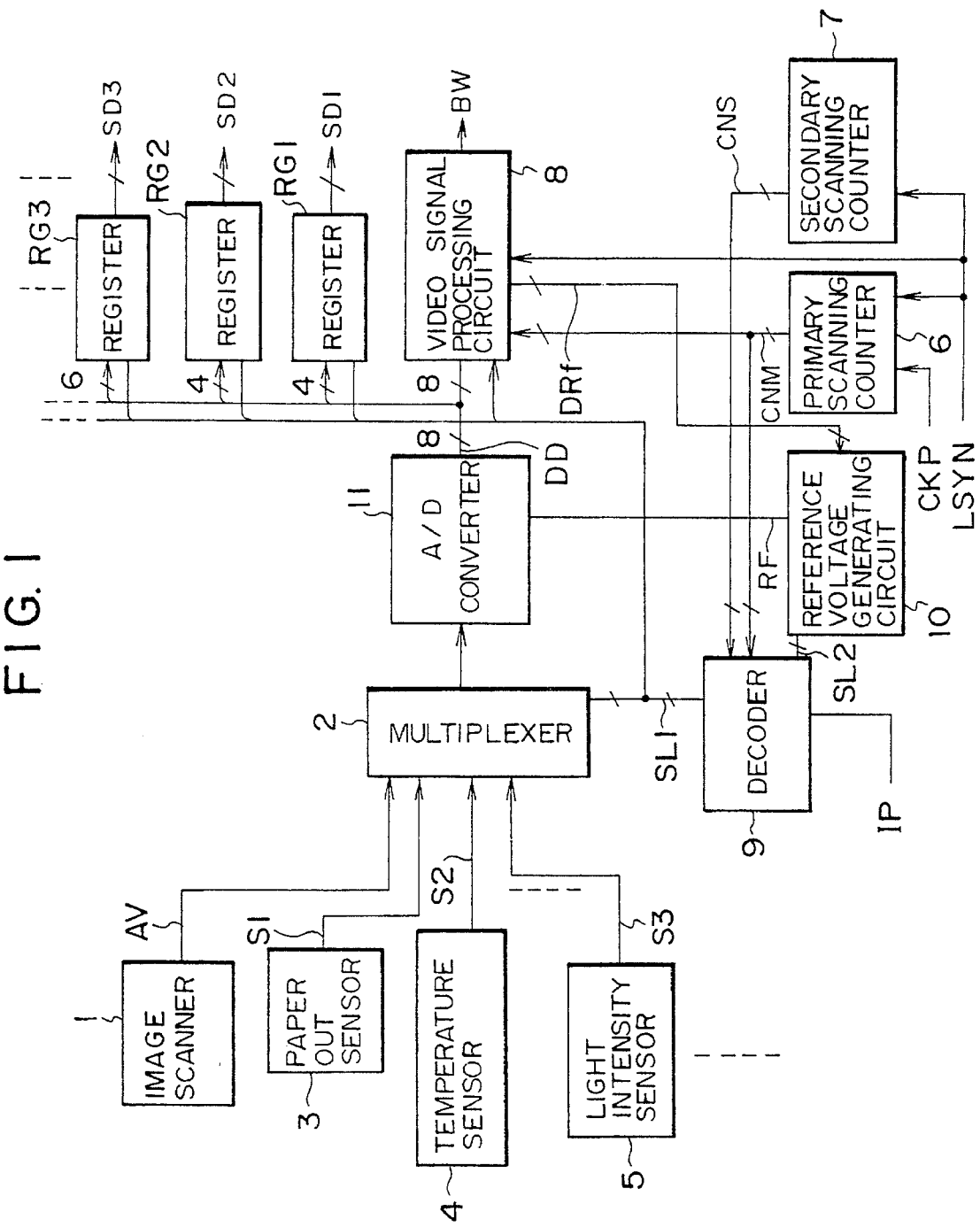
FIG. 1 is a block diagram of an essential part of an embodiment of a facsimile apparatus according to the present invention.
Figure 2:
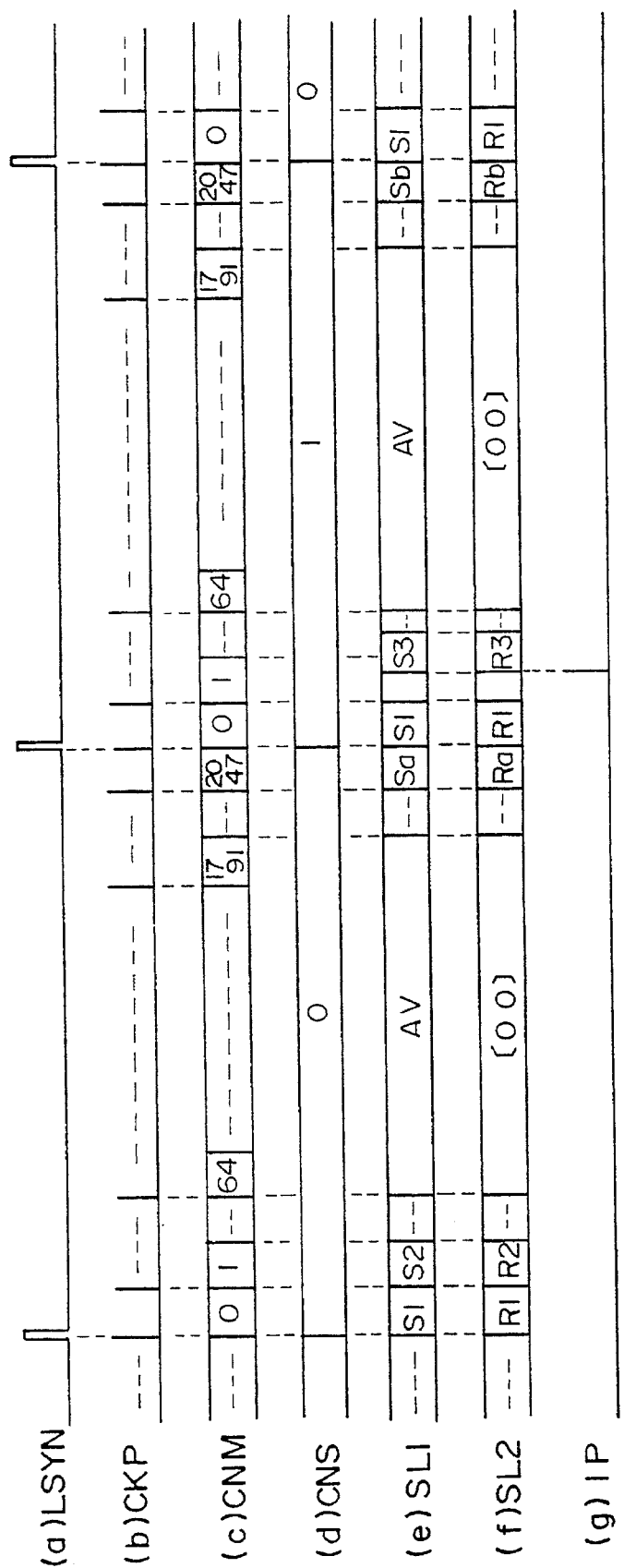
FIG. 2 is a waveform chart for explaining an operation of the facsimile apparatus shown in FIG. 1.

A description will now be given, with reference to FIGS. 1 and 2, of an embodiment according to the present invention. FIG. 1 shows an essential part of a facsimile apparatus according to the present invention.

In FIG. 1, an image scanner 1 scans an original so as to output an analog signal AV line by line. The analog signal AV is supplied to one of input terminals of a multiplexer 2.

A paper out sensor 3 detects a shortage of paper sheets in a paper supply unit of a laser printer (not shown in the figure), and outputs a detection signal S1. The detection signal S1 is supplied to one of the input terminals of the multiplexer 2.

A temperature sensor 4 measures a temperature at a predetermined position of a housing of the facsimile apparatus, and outputs a detection signal S2. The detection signal S2 is supplied to one of the input terminals of the multiplexer 2.

A light intensity sensor 5 receives and measures an intensity of an output light of a semiconductor laser used as a light source of the laser printer, and outputs a detection signal S3. The detection signal S3 is supplied to one of the input terminals of the multiplexer 2.

A primary scanning counter 6 counts the number of pulses of a pixel clock signal CKP, and outputs the count value, as a primary scanning count value CNM, to a decoder 9 and a video signal processing circuit 8. The pixel clock signal CKP indicates, as shown in FIG. 2(b), an output timing of each pixel data of the analog image signal AV output from the image scanner 1. The pixel clock signal CKP is generated by a timing control unit (not shown in the figure) provided in the facsimile apparatus.

A secondary scanning counter 7 counts the number of pulses of a line synchronization signal LSYN, and outputs the count value, as a secondary scanning count value CNS, to the decoder 9. The line synchronization signal LSYN indicates, as shown in FIG. 2(a), an output timing of each pixel data, which corresponds to a first position pixel of each scanning line, of the analog image signal AV output from the image scanner 1. The line synchronization signal LSYN is generated, similarly to the pixel clock signal CKP, by the timing control unit provided in the facsimile apparatus. The line synchronization signal may instead be generated by the primary scanning counter 6.

The count value of the primary scanning counter 6 is reset to 0 each time a pulse of the signal LSYN is supplied thereto. The secondary scanning count value CNS is reset each time the count value CNS reaches a predetermined number. In the present embodiment, the count value CNS output from the secondary scanning counter 7 is reset after the value CNS reaches 1, and thus the value CNS changes 0,1,0,1,0, . . . as shown in FIG. 2(d).

The decoder 9 generates selection signals SL1 and SL2 in accordance with the primary scanning count value CNM and the secondary scanning count value CNS. The selection signal SL1 is supplied to the multiplexer 2. Each of the registers RG1, RG2, RG3, . . . stores a predetermined bit signal of the selection signal LS1. The selection signal SL2 is supplied to a reference voltage generating circuit 10. Additionally, a timing signal IP, which indicates a detection timing of the light intensity sensor 5, is supplied to the decoder 9. The timing signal IP is generated in a central processing unit (not shown in the figure) provided in the facsimile apparatus. The light intensity sensor 5 performs a measuring operation in asynchronization with the scanning operation of the image scanner 1. When the detection timing signal IP is supplied to the decoder 9, the decoder 9 sets the values of the selection signals SL1 and SL2 so that they correspond to the value of the detection signal S3.

The multiplexer 2 selects one of the input terminals in accordance with the selection signal SL1. A signal being supplied to the selected input terminal is output to an A/D converter 11 as an analog signal AD.

The reference voltage generating circuit 10 generates, when the selection signal SL2 is not in an invalid state (for example, "00"), a voltage signal RF having an amplitude corresponding to a value of the selection signal SL2. When the value of the selection signal SL2 is in the invalid state, the reference voltage generating circuit 10 generates the reference voltage signal RF having an amplitude corresponding to a reference value signal DRf output from the video signal processing circuit 8. The reference voltage signal RF is supplied to a reference value input terminal of the A/D converter 11.

The A/D converter 11 converts the input analog signal AD into a digital signal DD having a predetermined number of bits. An upper limit of an input scale of the input analog signal is determined by the reference voltage signal RF supplied by the reference voltage generating circuit 10. The digital signal DD is supplied to the video signal processing circuit 8 and the registers RG1, RG2, RG3, . . . .

The video signal processing circuit 8 performs a predetermined video signal process, line by line, on the input digital signal DD by referring to a value of the primary scanning count value CNM. The video signal process includes a dark current correction, a shading correction, a peal-level correction, a MTF correction, a binarizing process, etc. The reference value signal, for example, is output to the reference signal generating circuit 10 so that a shading correction can be performed.

Each of the registers RG1, RG2, RG3, . . . samples and retains a predetermined number of bits, as a digital signal corresponding to the detection signals S1, S2, S3 . . . , of an upper part of the digital signal DD when a predetermined number of bit signals (a single bit signal in the present case) of the selection signal SL1 indicate a selection state. The stored data are output, as sensor data SD1, SD2, SD3, . . . , respectively, to the next stage circuit, such as a system controller (not shown in the figure) of the facsimile apparatus. That is, the system controller can read the data in the registers at a desired timing. In the present embodiment, 4 upper bits of the 8-bit digital signal DD are stored in each of the registers RG1 and RG2. 6 upper bits of the 8-bit digital signal DD are stored in the register RG3.

In the present embodiment, the line synchronization signal LSYN and the pixel clock signal CKP are output at a predetermined timing as shown in FIG. 2(a) and (b). Accordingly, the primary scanning count value CNM output from the primary scanning counter 6 is reset to 0 each time the line synchronization signal LSYN is supplied, and varies from 1 to 2047 each time the pixel clock signal CKP is supplied thereto as shown in FIG. 2(c). Additionally, the secondary scanning count value CNS output from the secondary scanning counter 7 changes alternately from 0 to 1 each time the line synchronization signal LSYN is supplied to the second scanning counter 7 as shown in FIG. 2(d).

In the present embodiment, the image signal corresponding to a single scan line comprises pixel data corresponding to 1,728 pixels. Accordingly, an effective period for the analog image signal AV is a period corresponding to 1,728 pixels from the 64th pixel to the 1,791th pixel. Invalid data is output in a period other than the effective period.

Accordingly, the decoder 9 selects, as shown in FIG. 2(e), the analog image signal AV as a value of the selection signal SL1, and selects the value for selecting the video signal processing circuit 8 during the effective period regardless of a value of the secondary scanning count value CNS. In the effective period, a value of the selection signal SL2 is set to be an invalid value as shown in FIG. 2(f).

During the effective period for the analog image signal AV, the analog image signal AV is supplied to the A/D converter 11 via the multiplexer 2. Thus the analog image signal AV is converted into the digital signal DD, and then the digital signal DD is supplied to the video signal processing circuit 8 as a digital image signal.

The digital image signal DD is supplied to the video signal processing circuit line by line, and is processed so that a binary image signal BW is output, line by line, from the video signal processing circuit 8. Additionally, the video signal processing circuit 8 processes pixels corresponding to addresses in the primary scanning direction during the effective period in which the primary scanning count value CNM varies from 64 to 1,791. Along with the processing of the pixels, the video signal processing circuit 8 performs, for example, a shading correction in which an operating range of the A/D converter 11 is adjusted by setting a value of the reference voltage signal DRf to be a value corresponding to each of the pixels.

On the other hand, during a period other than the effective period for the analog image signal AV, the A/D converter 11 can be used for sensors other than the image scanner 1. In order to use the A/D converter 11 with other sensors, the decoder sets values of each of the selection signals SL1 and SL2 in accordance with a sampling period set in the detection signal from each of the sensors.

That is, for example, if the detection signal S1 from the paper out sensor 3 is selected by the multiplexer 2, the detection signal is supplied to the A/D converter 11. At this time, the register RG1 is in the selected state, and thus the digital signal DD output from the A/D converter 11 is stored in the register RG1 as the sensor data SD1. Additionally, at this time, the reference voltage signal having a value appropriate to the detection signal S1 of the paper out sensor 3 is output from the reference voltage generating circuit 10, and thus an appropriate value of the sensor data SD1 can be obtained.

As mentioned above, the detection signal from one of the selected sensors is sampled during a predetermined period, and the detection signal is stored in the corresponding register after it is converted into a digital signal.

When the timing signal IP is supplied to the decoder 9 as shown in FIG. 2(g), the decoder 9 sets values of the selection signals SL1 and SL2 to be values corresponding to the detection signal S3. Similarly to the above-mentioned operation, the multiplexer 2 selects the detection signal S3 so as to supply the detection signal S3 to the A/D converter 11 as the analog signal AD. The A/D converter 11 performs a conversion in accordance with the reference voltage signal RF corresponding to the detection signal S3, and the result is output as the digital signal DD. At this time, since the register RG3 is in the selected state, the digital signal DD is stored in the register RG3 as the sensor data SD3.

As mentioned above, in the present embodiment, since the switching operation of the multiplexer 2 for the input of the A/D converter 11 is controlled by using count values of the primary scanning counter 6 and the secondary scanning counter 7, no special timing signal is required for controlling the multiplexer 2, and thus a peripheral circuit can have a simple construction.

Additionally, since the value of the reference voltage signal supplied to the A/D converter 11 from the reference voltage generating circuit 10 is set to be a value corresponding to the value of the detection signal being converted, an efficient signal conversion and a detection signal of exact accuracy can be obtained.

Since the appropriate part of the converted digital signal is stored in the corresponding register, the capacity of the registers can be reduced. Also, the system controller can read out the data stored in the register, only when it is needed, by accessing the corresponding register, and thus no special address generating system is needed. Accordingly, the facsimile apparatus can be prevented from having a complex construction.

Further, in the present embodiment, a non-periodically generated sensor signal can be reliably detected, and thus the analog to digital conversion system according to the present invention can be widely used with various facsimile apparatuses having different sensors. It should be noted that the non-periodically generated sensor signal should be sampled during a period other than the effective period for the analog image signal.

Although, in the above-mentioned embodiment, the digital signal from the A/D converter is stored in the register, the digital signal may instead be transferred to an external memory by means of a direct memory access (DMA) method. In such a case, transfer of the digital signal may be performed by a DMA controller normally provided in a facsimile apparatus, and thus no special address generating system is needed.

Additionally, although, in the above-mentioned embodiment, the secondary scanning count value CNS is reset for each two lines as shown in FIG. 2(d), the reset period for the secondary scanning count value CNS is not limited to the period corresponding to two lines.

The present invention is not limited to the specifically disclosed embodiment, and variations and modifications may be made without departing from the scope of the present invention.

What is claimed is:

1. A facsimile apparatus having an image scanner for outputting an analog image signal by scanning an original and a plurality of analog sensors for outputting respective analog detection signals, the facsimile apparatus comprising:

a) selecting means for selecting one analog signal from among the analog image signal and the analog detection signals;

b) analog/digital converting means for converting said one analog signal selected by said selecting means into a digital signal;

c) primary scanning counter means for counting a number of pulses of a pixel clock signal from a timing control circuit already provided in said facsimile apparatus, the pixel clock signal indicating a reading timing of pixel data of the analog image signal, so that the primary scanning counter means outputs a first count value, said first count value being reset each time a line synchronization signal indicating a first position of each scanning line is supplied thereto; and d) decoding means including:
1) first selection signal generating means for generating a first selection signal in accordance with the first count value supplied by said primary scanning counter means, and
2) means for supplying the first selection signal to the selecting means so that the selecting means selects said one analog signal corresponding to the first selection signal.

2. The facsimile apparatus as claimed in claim 1, wherein the first selection signal is generated so that the analog image signal is selected when the first count value is in a predetermined range.

3. The facsimile apparatus as claimed in claim 1, further comprising:
secondary scanning counter means for counting the line synchronization signal so as to output a second count value to said decoding means; and
wherein the first selection signal is reset each time the second count value changes.

4. The facsimile apparatus as claimed in claim 1, further comprising storing means for storing the digital signal output from said analog/digital converting means so that an arbitrary digital signal stored in said storing means is accessed by an external device.

5. The facsimile apparatus as claimed in claim 4, wherein said storing means comprises a plurality of registers corresponding to said analog sensors, and the facsimile apparatus further comprises register selecting means for selecting one of said registers in which the digital signal corresponding to an analog sensor selected according to the first selection signal is stored, said one of said registers being selected according to the first selection signal supplied to each of said registers.

6. The facsimile apparatus as claimed in claim 5, wherein each of said registers stores a predetermined bit signal of the first selection signal, each said predetermined bit signal corresponding to a respective one of the analog sensors so that each of said analog sensors is recognized by a corresponding one of said predetermined bit signals.

7. The facsimile apparatus as claimed in claim 1, further comprising:
reference voltage generating means for generating a reference voltage signal used for a conversion performed by said analog/digital converting means, and for outputting the reference voltage signal to said analog/digital converting means so that a voltage range represented by the digital signal output from said analog/digital converting means is determined according to the reference voltage signal; and
wherein said decoding means further comprises second selection signal generating means for generating a second selection signal corresponding to the first selection signal being generated, and for outputting the second selection signal to said reference voltage generating means so that the reference voltage signal is generated according to the second selection signal, said second selection signal representing a reference voltage corresponding to one of the analog signals selected according to the first selection signal.

8. The facsimile apparatus as claimed in claim 7, further comprising:
secondary scanning counter means for counting the line synchronization signal so as to output a second count value to said decoding means; and
wherein the first selection signal and the second selection signal are reset each time the second count value changes.

9. A facsimile apparatus having a plurality of analog sensors including an image scanner, at least one first sensor and at least one second sensor, said image scanner outputting an analog image signal by scanning an original, said first sensor outputting a first analog signal in synchronization with a scanning operation performed by said image scanner, said second sensor outputting a second analog signal in asynchronization with the scanning operation performed by said image scanner, the facsimile apparatus comprising:

a) selecting means for selecting one analog signal from among the analog image signal, the first analog signal and the second analog signal;

b) analog/digital converting means for converting said one analog signal selected by said selecting means into a digital signal;

c) primary scanning counter means for counting the number of pulses of a pixel clock signal from a timing control circuit already provided in said facsimile apparatus, the pixel clock signal indicating a reading timing of pixel data of the analog image signal, so that the primary scanning counter means outputs a first count value, the first count value being reset each time a line synchronization signal indicating a first position of each scanning line is supplied thereto; and d) decoding means including:
1) first selection signal generating means for generating a first selection signal in accordance with the first count value supplied by said primary scanning counter means, and
2) means for supplying the first selection signal to said selecting means so that said selecting means selects said one analog signal corresponding to the first selection signal,
wherein said first selection signal is generated when a signal representing a detection timing of the second analog signal output from said second sensor is supplied to said decoding means, so that the second analog signal output from said second sensor is selected by said selecting means.

10. The facsimile apparatus as claimed in claim 9, wherein the first selection signal is generated so that the analog image signal is selected when the first count value is in a predetermined range.

11. The facsimile apparatus as claimed in claim 9, further comprising:
secondary scanning counter means for counting the line synchronization signal so as to output a second count value to said decoding means; and
wherein the first selection signal is reset each time the second count value changes.

12. The facsimile apparatus as claimed in claim 9, further comprising storing means for storing the digital signal output from said analog/digital converting means so that an arbitrary digital signal stored in said storing means is accessed by an external device.

13. The facsimile apparatus as claimed in claim 12, wherein said storing means comprises a plurality of registers corresponding to said first and second analog sensors, and the facsimile apparatus further comprises register selecting means for selecting one of said registers in which the digital signal corresponding to the analog sensor selected according to the first selection signal is stored, said one of said registers being selected according to the first selection signal supplied to each of said registers.

14. The facsimile apparatus as claimed in claim 13, wherein each of said registers stores a predetermined bit signal of the first selection signal, each said predetermined bit signal corresponding to a respective one of the analog sensors so that each of said first and second analog sensors is recognized by a corresponding one of said predetermined bit signals.

15. The facsimile apparatus as claimed in claim 9, further comprising:

reference voltage generating means for generating a reference voltage signal used for a conversion performed by said analog/digital converting means, and for outputting the reference voltage signal to said analog/digital converting means so that a voltage range represented by the digital signal output from said analog/digital converting means is determined according to the reference voltage signal; and wherein said decoding means further comprises second selection signal generating means for generating a second selection signal corresponding to the first selection signal being generated, and for outputting the second selection signal to said reference voltage generating means so that the reference voltage signal is generated according to the second selection signal, said second selection signal representing a reference voltage corresponding to one of the first and second analog signals selected according to the first selection signal.

16. The facsimile apparatus as claimed in claim 15, further comprising:

secondary scanning counter means for counting the line synchronization signal so as to output a second count value to said decoding means; and wherein the first selection signal and the second selection signal are reset each time the second count value changes.

* * * * *